United States Patent
Ruth

[15] 3,678,902
[45] July 25, 1972

[54] TIMED ANIMAL FEEDER

[72] Inventor: Arthur P. Ruth, 2302 Brookmere, Houston, Tex. 77008

[22] Filed: July 21, 1972

[21] Appl. No.: 56,923

[52] U.S. Cl. .................................... 119/51.11, 222/556
[51] Int. Cl. ............................................. A01k 5/02
[58] Field of Search .................. 222/52, 70, 410, 457, 454, 222/456, 504, 556; 198/128; 137/78; 250/239, 237; 239/67; 119/106, 51 R, 51.11, 56 A, 51.11; 214/17 R, 83.18

[56] References Cited

UNITED STATES PATENTS

| | | | |
|---|---|---|---|
| 2,314,109 | 3/1943 | Smith | 119/56 A UX |
| 3,256,861 | 6/1966 | Giltner | 222/70 X |
| 3,419,726 | 12/1968 | Olsen | 250/237 |
| 3,083,471 | 4/1963 | Hurtington | 222/410 X |
| 2,557,358 | 6/1951 | Martinson | 222/504 X |
| 3,195,508 | 7/1965 | Lehman et al. | 119/56 R |
| 3,227,311 | 1/1966 | Rowell | 222/52 |
| 2,510,158 | 6/1950 | Van Ackeren | 222/70 X |
| 3,260,034 | 7/1966 | Major | 119/106 X |
| 2,502,591 | 4/1950 | Ray | 250/239 |
| 2,538,421 | 1/1951 | Knarreborg | 119/51 R X |

*Primary Examiner*—Robert B. Reeves
*Assistant Examiner*—Norman L. Stack, Jr.
*Attorney*—Donald Gunn

[57] ABSTRACT

A timed animal feeder which is responsive to sunrise and sunset to trigger the distribution of animal feed. In one embodiment, the feed bin has an open hole at its bottom which accumulates a predetermined charge of feed on a trough. When the sensor notes sunrise or sunset, the trough is tipped and aligned with a chute extending out of the equipment for dumping the animal feed. The trough is then rocked back to its original position and another charge or accumulation of animal feed on the trough is collected for the next feeding. If water is required for the feed, a water dispenser is operated simultaneously. In another embodiment, occurrence of sunrise or sunset triggers into operation a motor rotated slinger which is positioned beneath the feed bin having a hole at its bottom. A charge of animal feed is accumulated on the slinger and when the motor is driven, the food is slung out of the equipment. The end of rotation permits an accumulation of an additional charge of animal feed on the slinger.

5 Claims, 7 Drawing Figures

Patented July 25, 1972
3,678,902
3 Sheets-Sheet 1
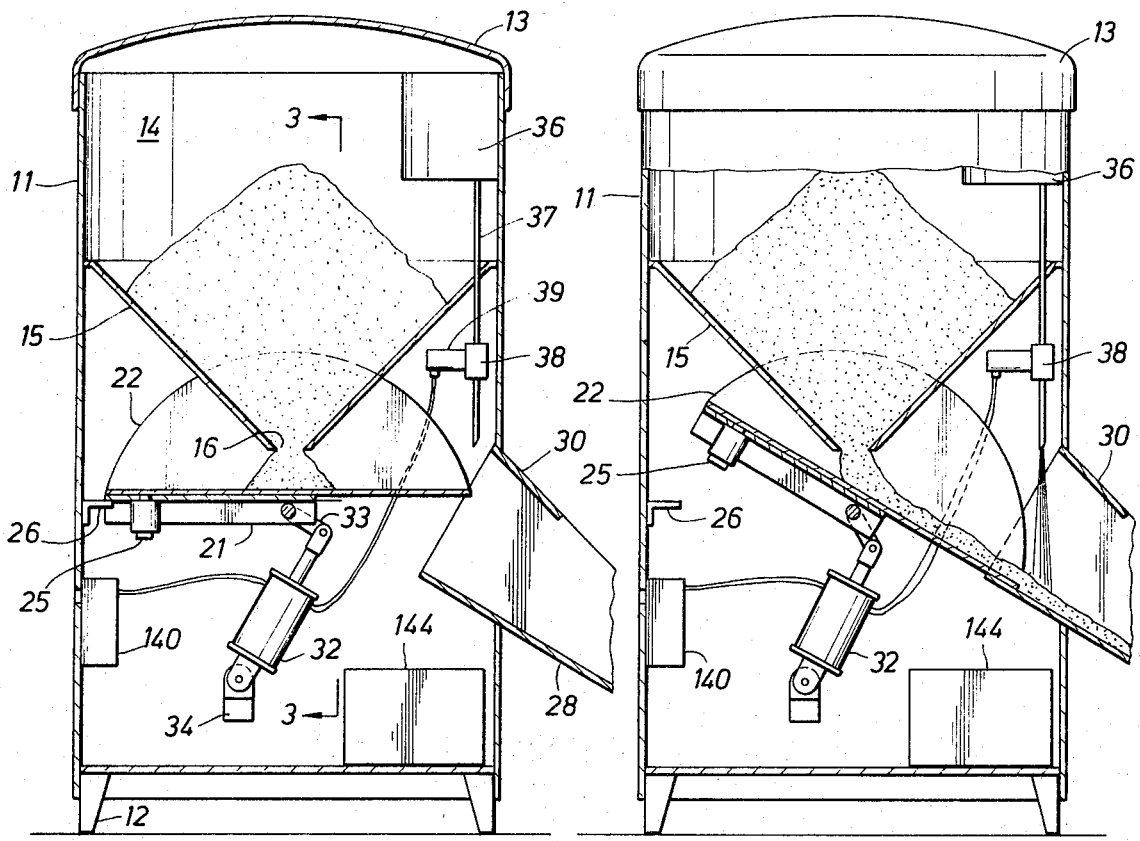
FIG. 1
FIG. 2
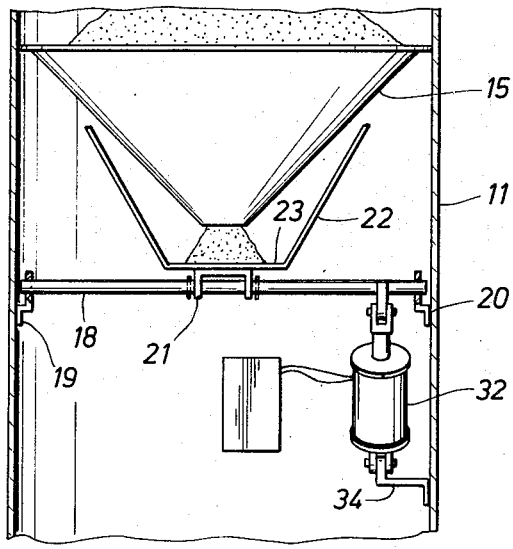
FIG. 3
Arthur P. Ruth
INVENTOR
BY Donald Gunn
ATTORNEY Patented July 25, 1972

Arthur P. Ruth
INVENTOR

BY Donald Gunn

ATTORNEY

Patented July 25, 1972　　　　　　　　　　　　3,678,902

Arthur P. Ruth
INVENTOR

BY S Donald Gunn

ATTORNEY

3,678,902

TIMED ANIMAL FEEDER

RELATED APPLICATIONS

Applicant has no presently pending related applications.

SUMMARY OF PROBLEM AND SOLUTION

In many circumstances, it is necessary to feed animals, but quite inconvenient for an attendant to travel to some remote location to distribute food at regular intervals. The customary feeding habits of animals are dawn and dusk. While many animals might brouse or graze during the day, nevertheless, it is almost imperative that they have two relatively substantial feedings in a day.

Many remote feeding installations have been attempted heretofore. They have utilized such things as timers and the like. While to some extent they have been more or less successful, it is believed that the present invention will provide an improved remote animal feeder in several regards as will be described.

The present invention is summarized as including a large storage bin for receiving a supply of feed to last for some period of time. The storage bin is preferably at the upper end of the equipment, and holds many pounds of food. The bin slopes downwardly in the form of a funnel and has a small central opening at its center. The central opening is of sufficient diameter with respect to the granular size of the feed to permit the feed to pass therethrough somewhat continuously. However, a surface means positioned immediately below the opening allows a small accumulation of feed passing from the storage bin to plug up the opening. The apparatus includes two embodiments of the means for accumulating the charge of animal feed. One means utilizes a pivotally mounted trough which has a first position for accumulating the charge of animal feed. It has a second position in which it is tilted and the animal feed slides out through a chute in the side wall of the apparatus to a point remote from the apparatus for feeding the animals. The other embodiment utilizes a slinger disc just below the opening. The slinger disc accumulates a charge of animal feed. When the disc is rotated, centrifugal force throw the animal feed out of the apparatus from the slinger. Both the slinger and the trough, when in the unactivated position, accumulate the next charge of feed thereon. The apparatus is triggered by a circuit means which is responsive to changes in light level which are roughly associated with daylight and dusk.

Many objects and advantages of the present invention will become more readily apparent from a consideration of the below included specification and drawings, which are:

FIG. 1 shows the first embodiment of the present invention wherein a trough is positioned beneath a feed bin for accumulating a charge of animal food;

FIG. 2 is similar to FIG. 1 showing the trough tilted for delivering the charge of animal food outside the apparatus;

FIG. 3 is a sectional view taken along the line 3 — 3 of FIG. 1 illustrating details of construction of the trough and the means for tilting same;

Figure 4:
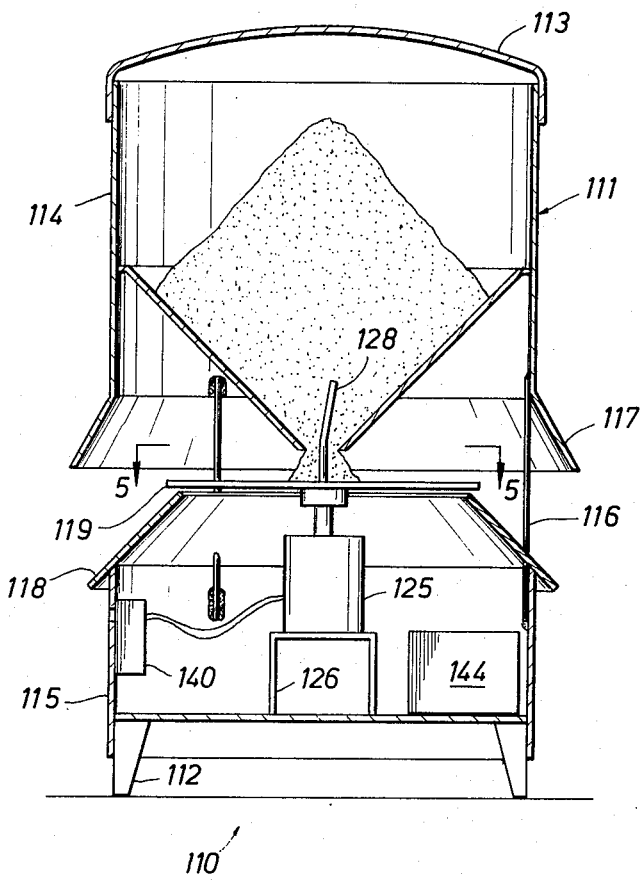
FIG. 4 is a sectional view of an embodiment similar to that of FIG. 1 except that it utilizes a motor rotated slinger beneath the feed bin.

In the drawings, attention is first directed to FIG. 1 which illustrated the animal feeder 10 in sectional view. The animal feeder 10 includes a generally cylindrical body 11 which rests on a number of feet 12. The body is preferably cylindrical and relatively tall. Its top is indicated by the numeral 13 and is removable to permit filling with feed. A very substantial large storage space is indicated generally in the volume at 14, and it terminates at a funnel shaped metal member 15. The funnel shaped member is supported by welding, or is otherwise joined to the cylindrical body member 11 at its periphery. The volume 14 is quite large and is adapted to receive a substantial quantity of feed. Certain problems might arise with feed deterioration when stored in the open, and these factors must be considered. Also, if the feed is particularly hydroscopic, the quantity of feed to be stored might be limited. In any case, the volume 14 is a substantial storage volume for receiving the particulate feed therein.

The funnel 15 includes a small opening at 16. The opening 16 is preferably centered in the funnel 15, the funnel opening 16 being of substantial size to permit the granular feed to pass therethrough without clogging of plugging up. That is to say, if the flow were unimpeded, all of the feed would run out over an interval of time. The opening is relatively small in comparison with the total cross sectional area of the cylindrical housing 11, but is, nevertheless, sufficiently large to drain the feed from the housing.

Attention is next directed to FIG. 3 of the drawings which identifies a support bar 18 which fully spans across the housing 11. The support bar 18 is pivotally mounted at both ends by a pair of upstanding bracket means 19 and 20. The brackets 19 and 20 have an opening which permits rotation of the support bar 18.

At the center of the support bar 18, a bifurcated connector 21 supports the trough 22. The trough 22 is shown in sectional view of FIG. 3 as having a bottom plate 23 and a pair of side walls which stand above the bottom plate and which extend higher than the opening 16 in the funnel 15. As shown in FIG. 1, the bottom plate 23 has a normal position at rest which is just below the opening 16 and it is preferably horizontal as is the opening. A charge of particulate animal food is accumulated on the plate 23. As the charge increases, it builds a conical accumulation which tends to block the opening 16. Thus, the physical proximity of the trough 22 to the opening 16 limits the size of the charge. The spacing can be varied to dispense a larger charge of food. Likewise, the gap between the opening 16 and the metal plate 23 can be narrowed to reduce the quantity of food distributed each time.

The trough 22 is supported along a substantial portion of its length by the bracket 21. A weight 25 is attached to the left hand end of the trough as shown in FIG. 1. The weight 25 tends to return the trough to its original horizontal position in the manner shown in FIG. 1. The trough 22 pivots about the support rod 18 to a position best illustrated in FIG. 2. FIG. 2 shows a stop bracket 26 mounted on the inside wall of the cylindrical structure 11. This stops counterclockwise movement of the trough and holds it in the preferred horizontal posture best shown in FIG. 1.

The numeral 28 indicates a protruding chute extending from the housing 11 for delivering the food at a particular location. The chute may be stubbed off, or may be of substantial length. It is preferably covered at least partly by a means 30 to keep rain water from entering the housing 11. The chute 28 is below and at the right hand end of the trough 22. When the trough is tipped, the right hand end enters the chute 28 at least partly, but is stopped to align the trough and the chute in the manner shown in FIG. 2.

In FIG. 1, the numeral 32 indentifies a solenoid connected with an eccentric arm 33. The lower end of the solenoid 32 is pivotally mounted on a bracket 34. The solenoid, when actuated, pulls the eccentric arm 33 toward it and overcomes the weight of the counterbalance 25 and the bracket 21 which are located to the left of the pivot for the trough 22. A relatively short stroke is needed because a slight movement of the right hand end of the trough downwardly in clockwise rotation causes the animal feed to cascade across the trough toward the chute 28. This provides an offsetting balance or weight on the right hand side of the chute. The shift in the feed aids and assists the clockwise rotation of the trough to the aligned position with the chute. This then dumps the feed outside of the feeder 10.

Once the grain or feed begins to run down the trough and the chute, the opening 16 is then cleared. If desired, the solenoid 32 can hold the chute in the tipped position of FIG. 2 for a long interval of time, and the amount of animal feed distributed at this particular feeding will be large. The amount of feed distributed is approximately proportional to the time interval the solenoid is actuated. Of course, only a short interval is required to dump the accumulation or charge previously left on the trough from its prior operation. But in any case, a desired quantity is accumulated and distributed by the animal feeder 10 by holding the solenoid 32 in its operative state for a necessary interval.

Once the current flow to the solenoid 32 is terminated, the counter weight 25 and the weight of the bracket 21 returns the trough 22 to its horizontal posture of FIG. 1. This is the time at which the animal feed continues to flow through the opening 16, but its flow is impeded by the accumulation on the trough. Hence, after each operation, another charge of animal feed is at least partially distributed and accumulated on the trough for the next feeding.

The numeral 36 indicates a water storage tank which is in the upper portions of the cylindrical housing 11. The size of the tank is subject to variation essentially without limit. The tank is preferably formed of a plastic material so as to be expandable in the case of freezing weather. The tank 36 is preferably vented to atmosphere also. When the water level in the tank 36 goes down, a vent or port to atmosphere releaves the internal pressure and permits the downward flow of the water in the tank.

The tank 36 is relatively high to provide a head of water and some pressure forcing it through the distribution system. The tank 36 is connected with a flow line 37 which is opened and closed at a valve 38. The valve 38 is operated by a solenoid 39. The spout of the line 37 is located above the chute 28 to drip or flow water into the chute 28. The solenoid 39 is connected in parallel with the solenoid 32. Hence, when the animal feed is dumped by the trough 22, the water is added to the animal feed for a coterminous interval. The water is added to the feed as it flows down the chute and some mixing is obtained whereby feeds requiring the addition of water can be used in the equipment.

The foregoing set forth the operation of the apparatus. The circuitry means of FIG. 6 will be discussed with a view of detailing the means causing the equipment to distribute the feed at daylight and dusk.

Attention is directed to FIG. 4 of the drawings which illustrates an alternative embodiment indicated by the numeral 110. The embodiment 110 includes a housing 111 which is closed over by a top 113. The structure supported on a plurality of legs 112 in the same manner as the embodiment 10. The cylindrical body is divided into tow portions, an upper portion indicated by the numeral 114, and a lower portion indicated by the numeral 115. They are supported in spaced alignment by support rods 116 which are relatively thin, and which are spaced at three or four locations around the circumference. This defines a fully encircling slot or opening save for the narrow space required by the support rods 116. A skirt 117 is located just above the open slot which encircles the housing 111. The skirt 117 is concentric with the space from an additional skirt 118 which is likewise fully encircling in the same manner. The two skirts prevent the intrusion of rain, and cooperate to direct feed which is thrown or slung from the embodiment 110 to an encircling location about the animal feeder 110. More will be noted concerning this hereinafter.

Figure 5:
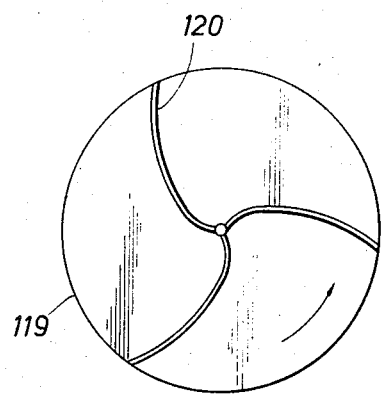
FIG. 5 is a sectional view taken along the line 5 — 5 of FIG. 4 for illustrating details of construction of the slinger.

The apparatus is similar in the provision of a funnel having a small opening therein. A slinger plate 119 is positioned just below the opening of the funnel, the plate being shown in greater detail in FIG. 5. In FIG. 5, the slinger plate will be noted to have two or three vanes 120 which, on rotation, cause the particulate matter to be slung outwardly of the equipment. The direction of rotation will be noted in FIG. 5. The direction of rotation in cooperation with the vanes 120 causes the granular feed to be slung in all directions about the feeder 110. The grain as it is slung from the housing 111 passes between the skirts 117 and 118 as best illustrated in FIG. 4. The slinger gives a more scattered distribution of the animal feed in comparison with the version 10 shown in FIG. 1 and 2. This is sometimes of assistance in feeding a flock of birds or the like.

The slinger 119 is mounted on the drive shaft of the motor 125. The motor 125 sits on a support 126. The slinger 119 concentrically supports a stirring rod 128 which extends into the mass of animal feed. The stirring rod is essentially concentric and straight for a portion, and slightly dog-legged at its upper end as shown in FIG. 4. This agitates the entire mass, not too violently, to cause it to flow and prevent sticking in the mouth of the opening in the funnel.

Figure 6:
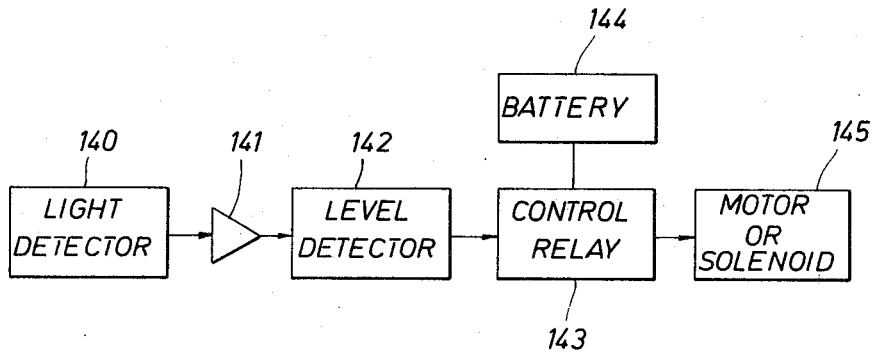
FIG. 6 is a schematic block diagram of means for activating the animal feeder of the present invention at daylight and dusk; and, FIG. 7 shows a further embodiment in which one wall of the container extends to the opening of the funnel to improve the rate of flow of granular feed.

Attention is next directed to FIG. 6 of the drawings which describes the circuitry which renders the equipment operative at daylight and dusk. The numeral 140 indicates a light detector. It is a level detector which responsive to the level of light in the vicinity of the feeders 10 and 110. The light detector forms an output signal indicative of the light level, which is coupled through an amplifier 141 and input to a level detector 142. The level detector is preferably responsive to changes in light level from darkness to daylight. This will be understood to be a gradual change in light level, and the apparatus triggers at a more or less approximate level of ambient light. In any case, it is a level detector which operates when the signal from the detector 140 crosses through a predetermined or set value. The value should be set sufficiently high to prevent triggering on the darkness caused by a thunder storm or heavy cloud cover. This would allow the dispensing of too much food during a 24 hour period.

The level detector 142 operates a time controlled relay 143. The relay 143 communicates electrical power from the battery 144 to a motor or solenoid 145. The motor 125 and the solenoid 32 shown in the previously described embodiments constitute suitable motive means for use in FIG. 6 as the means 145. Preferably, the control relay is a timed device. Hence, a short input trigger signal of perhaps a few milliseconds duration triggers the relay for operation for a fairly lengthy interval. By way of example, it can be triggered on for one or two minutes. This again depends upon the amount of feed to be dispensed by the embodiments 10 and 110. The amount of feed to be dispensed is preferably determined by the number and size of animals to be fed, and hence, the control relay should be an adjustable timing relay as is available from a number of manufacturers.

It will be observed that the battery 144 is preferably a 12 or 24 volt automotive battery which has a charge of several hundred ampere hours. It will have to be replaced periodically, and can serve as the voltage source for the light detector, level detector, and associated electronic apparatus.

The means 140 is located in both FIGS. 1 and 4, and is exposed through an opening to the ambient light for the measurements which are described above.

In generalization, the operating technique of the embodiment 110 is believed apparent from the foregoing description. The apparatus is different in that it distributes the animal feed rather broadly over an area, while the version of FIG. 1 essentially pours the feed into a pile on the ground or in a feed trough. As mentioned before, the embodiment 110 might be preferred for small fowl such as quail, partridge, and the like.

Many alterations and variations can be adopted in the foregoing structures, such as the use of all sheet metal or plastic components in the fabrication of the embodiments. It might be preferable to place a gasket in the lids 13 and 113 to essentially seal the storage portions against the intrusion of water or humidity. This might be helpful in preventing coagulation of the granular food materials.

Figure 7:
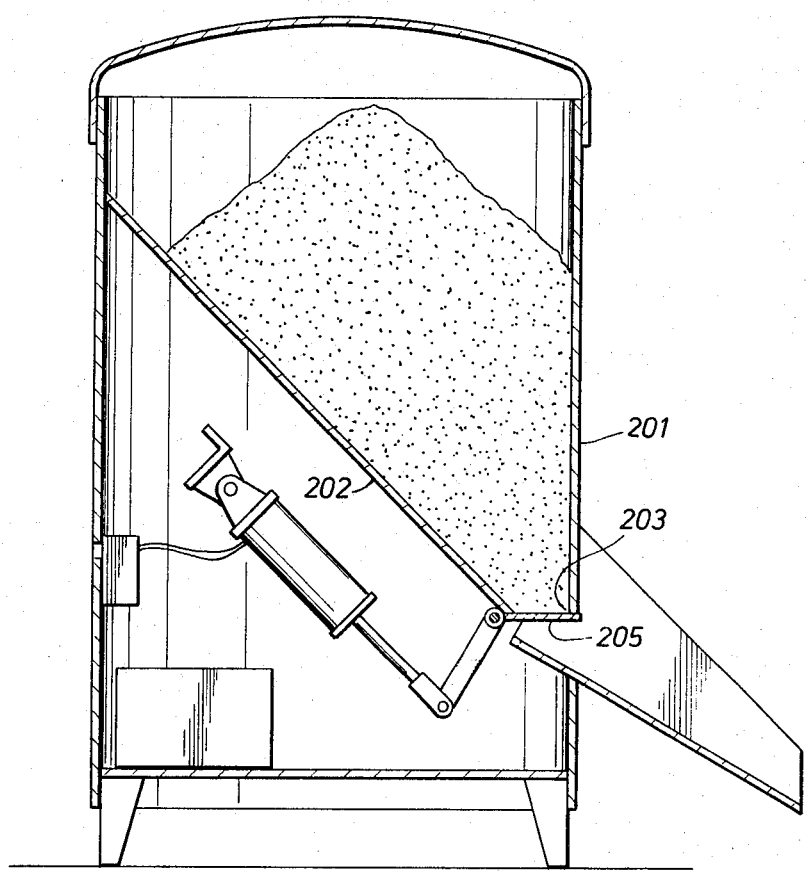

FIG. 7 is included for the purpose of showing the use of a vertical side wall extending all the way to the opening of the funnel. Sometimes, the animal feed tends to absorb water and becomes caked in the storage bin. The inclined surface of the embodiments previously shown may not create enough of a gravity component to break up the caked feed. To overcome this tendency, the vertical wall adjacent the funnel tends to bread up caked feed and initiates the general gravitational movement of the material through the funnel opening. While the vertical side wall connects with the opening in a manner to change the opening from perfectly round to something other than circular, this in no particular problem. Thus, for sake of nomenclature, FIG. 7 includes a vertical side wall 201, and a storage bin wall 202 which converge at an opening 203. The opening is closed by a movable door 205 which can either close the opening or else jam the feed material in the manner of FIGS. 1 and 4.

While many alternations and variations can be described, the scope of the present invention is determined by the claims which are appended hereto.

What is claimed is:

1. An animal feeding apparatus comprising:
   a storage container for receiving a large quantity of particulate animal food therein;
   an opening means in said container near the lower portions thereof;
   trough means positioned below said opening means for receiving animal food thereon;
   a pivot supporting said trough for rotational movement through a predetermined angle;
   motive means operably connected to said trough means and pivot for rotating said trough means about said pivot;
   said pivot positioning said trough means a distance from said opening means such that particulate feed falls therethrough and accumulates on said trough means, said opening means being closed on accumulation sufficient to build up to said opening means and block said opening means to prevent the further flow of particulate feed so long as said accumulation remains;
   a housing generally enclosing said storage container and said trough means to limit exposure of the particulate feed to inclement weather;
   means for periodically activating said motive means to dispense animal feed; and,
   chute means extending to the exterior of said housing and positioned to receive the particulate animal feed thereon and being sloped to cause the feed to fall to a point exterior of said housing, said chute means being positioned with respect to said trough means to receive the animal feed when said trough means is rotated.

2. The invention of claim 1 further including:
   a water container;
   a spigot positioned above said chute means;
   a line connecting said spigot to said container; and,
   valve means in said line for controlling flow of water to said spigot.

3. The structure of claim 1 being further defined and including:
   an electric solenoid having a movable shaft;
   an eccentric connected to the movable shaft of said electric solenoid; and,
   a pivot point connected with said eccentric for rotating about an axis therethrough.

4. The structure of claim 3 further including means responsive to ambient light levels for controlling the operation of the present apparatus.

5. The structure of claim 1 wherein said housing includes a removable top which exposes said storage container.

* * * * *